US011879420B1

(12) United States Patent
Sim et al.

(10) Patent No.: US 11,879,420 B1
(45) Date of Patent: Jan. 23, 2024

(54) SYSTEM AND METHOD FOR CONTROLLING IGNITION COIL

(71) Applicants: Hyundai Motor Company, Seoul (KR); Kia Corporation, Seoul (KR)

(72) Inventors: Kiseon Sim, Suwon-si (KR); Soo Hyung Woo, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/318,021

(22) Filed: May 16, 2023

(30) Foreign Application Priority Data

Nov. 18, 2022 (KR) ........................ 10-2022-0155374

(51) Int. Cl.

| | |
|---|---|
| ***F02P 3/045*** | (2006.01) |
| ***F02P 9/00*** | (2006.01) |
| ***F02P 17/12*** | (2006.01) |

(52) U.S. Cl.
CPC ............... *F02P 17/12* (2013.01); *F02P 3/045* (2013.01); *F02P 3/0453* (2013.01); *F02P 3/0456* (2013.01); *F02P 9/002* (2013.01); *F02P 2017/128* (2013.01)

(58) Field of Classification Search
CPC ........ F02P 3/045; F02P 3/0453; F02P 3/0456; F02P 9/002; F02P 17/12
USPC ................. 123/609–611, 622, 626, 637, 640
See application file for complete search history.

(56) References Cited

U.S. PATENT DOCUMENTS

| | | | | |
|---|---|---|---|---|
| 3,760,782 | A * | 9/1973 | Meyer | F02P 3/005 123/621 |
| 3,885,541 | A * | 5/1975 | Hufton | F02P 1/086 123/621 |
| 4,183,340 | A * | 1/1980 | Gilbert | F02P 15/10 123/620 |
| 4,915,087 | A * | 4/1990 | Boyer | F02P 15/10 123/643 |
| 5,197,449 | A * | 3/1993 | Okamoto | F02P 3/0453 123/622 |
| 6,328,025 | B1 * | 12/2001 | Marrs | F02P 3/02 123/622 |
| 9,429,134 | B2 | 8/2016 | Desai et al. | |
| 9,531,165 | B2 * | 12/2016 | Ruan | F02P 3/0407 |
| 9,605,644 | B2 * | 3/2017 | Huberts | F02P 3/04 |
| 10,006,432 | B2 | 6/2018 | Desai et al. | |
| 2006/0201475 | A1 * | 9/2006 | Shiraishi | F02P 3/053 123/305 |
| 2009/0126710 | A1 * | 5/2009 | Alger | F02P 15/08 123/634 |

(Continued)

*Primary Examiner* — Erick R Solis
(74) *Attorney, Agent, or Firm* — Slater Matsil, LLP

(57) ABSTRACT

An embodiment system for controlling an ignition coil includes a first ignition coil including a first primary coil and a first secondary coil, a second ignition coil including a second primary coil and a second secondary coil, a spark plug including a pair of electrodes configured to generate a spark discharge by a discharge current generated by the first ignition coil and the second ignition coil, and a controller configured to selectively perform a multi-stage ignition through the first ignition coil and the second ignition coil or a single-stage ignition through the first ignition coil or the second ignition coil depending on an operation region of an engine and, in response to a misfire occurring in the engine while performing the multi-stage ignition, to adjust a number of ignitions or a dwell time.

16 Claims, 10 Drawing Sheets

(56) References Cited

U.S. PATENT DOCUMENTS

| | | | | |
|---|---|---|---|---|
| 2012/0160222 A1* | 6/2012 | Grady | .................. | F02P 3/0453<br>123/622 |
| 2015/0330353 A1* | 11/2015 | Bengtsson | ............. | F02P 17/12<br>123/637 |

* cited by examiner

SYSTEM AND METHOD FOR CONTROLLING IGNITION COIL

CROSS-REFERENCE TO RELATED APPLICATIONS

This application claims the benefit of Korean Patent Application No. 10-2022-0155374, filed on Nov. 18, 2022, which application is hereby incorporated herein by reference.

TECHNICAL FIELD

The present disclosure relates to a system and a method for controlling an ignition coil.

BACKGROUND

Generally, an engine is a device that generates power by combusting air and fuel in a cylinder.

In order for the air/fuel mixture of air and fuel to normally combust in the cylinder, various variables such as the ratio of air and fuel, fuel injection timing, and ignition timing in the case of a gasoline engine must be operated as designed. Due to various factors, the air/fuel mixture in the cylinder may not be sufficiently (i.e., normally) combusted, and this case is called a misfire.

When a misfire occurs in the cylinder, the fuel does not react sufficiently with air and may be exhausted unburned. For example, hydrocarbon (HC) may be exhausted in a large amount.

The above information disclosed in this background section is only for enhancement of understanding of the background of embodiments of the disclosure, and therefore it may contain information that does not form the prior art that is already known to a person of ordinary skill in the art.

SUMMARY

Embodiments of the present disclosure provide a system for controlling an ignition coil capable of minimizing occurrence of misfire in a cylinder of an engine.

A system for controlling an ignition coil includes a first ignition coil including a first primary coil and a first secondary coil, a second ignition coil including a second primary coil and a second secondary coil, a spark plug including a pair of electrodes configured to generate a spark discharge by a discharge current generated by the first ignition coil and the second ignition coil, and a controller configured to selectively perform a multi-stage ignition through the first ignition coil and the second ignition coil, or a single-stage ignition through one ignition coil among the first ignition coil and the second ignition coil depending on an operation region of an engine, and when a misfire occurs in the engine, adjust a number of ignitions or a dwell time while performing the multi-stage ignition.

When the operation region of the engine is an operation region in which an EGR gas is used or lean combustion is performed, the controller may perform the multi-stage ignition, and in an operation region excluding the operation region, the controller may perform the single-stage ignition.

When the misfire occurs in the engine, the controller may increase a number of discharges of the first ignition coil and the second ignition coil or may increase the dwell time of the first ignition coil and the second ignition coil.

The controller may be configured to determine whether the misfire of the engine occurs based on a change amount of an engine speed measured by a speed sensor.

The controller may be configured to determine whether the misfire of the engine occurs based on a change amount of an oxygen concentration measured by a lambda sensor.

A method for controlling an ignition coil includes determining, by a controller, an operation region of an engine, performing, by the controller, a multi-stage ignition when the operation region of the engine is an operation region in which an EGR gas is used or lean combustion is performed or performing a single-stage ignition in an operation region excluding the operation region, determining, by the controller, whether the misfire of the engine occurs, and when the misfire occurs in the engine, temporarily increasing, by the controller, a number of ignitions or a dwell time while performing the multi-stage ignition.

According to a system for controlling an ignition coil according to an embodiment, when the misfire occurs in the cylinder of the engine performing the lean combustion, the possibility of misfire generation may be minimized by temporarily increasing the number of ignitions and the charging time of the ignition coil.

BRIEF DESCRIPTION OF THE DRAWINGS

These drawings are for reference only in describing embodiments of the present disclosure, and therefore the technical idea of the present disclosure should not be limited to the accompanying drawings.

DETAILED DESCRIPTION OF ILLUSTRATIVE EMBODIMENTS

Figure 1:
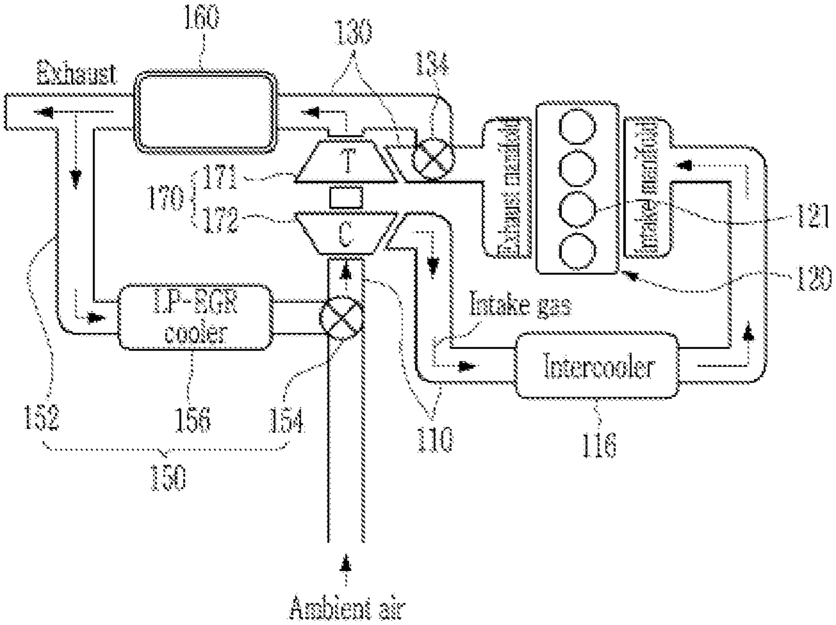
FIG. 1 is a schematic view illustrating a configuration of an engine system according to an embodiment.

Embodiment of the present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clearly describe embodiments of the present disclosure, parts that are irrelevant to the description are omitted, and identical or similar constituent elements throughout the specification are denoted by the same reference numerals.

In addition, since the size and thickness of each configuration shown in the drawings are arbitrarily shown for convenience of description, embodiments of the present disclosure are not necessarily limited to the configurations illustrated in the drawings, and in order to clearly illustrate several parts and areas, enlarged thicknesses are shown.

The terms “module” and “unit” for components used in the following description are used only in order to make the specification easier to understand. Therefore, these terms do not have meanings or roles that distinguish them from each other by themselves.

In describing embodiments of the present specification, when it is determined that a detailed description of the well-known art associated with the embodiments of the present invention may obscure the gist of the embodiments of the present invention, it will be omitted.

The accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components and are not interpreted as limiting these components.

As used herein, the singular forms “a,” “an,” and “the” are intended to include the plural forms as well, unless the context clearly indicates otherwise.

The terms are only used to differentiate one component from others.

It is to be understood that when one component is referred to as being “connected” or “coupled” to another component, it may be connected or coupled directly to another component or it may be connected or coupled to another component with the other component intervening therebetween.

On the other hand, it is to be understood that when one component is referred to as being “connected or coupled directly” to another component, it may be connected or coupled to another component without the other component intervening therebetween.

It will be further understood that the terms “comprises” and “have” used in the present specification specify the presence of stated features, numerals, steps, operations, components, parts, or a combination thereof, but do not preclude the presence or addition of one or more other features, numerals, steps, operations, components, parts, or a combination thereof.

The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

First, an engine system to which a system for controlling an ignition coil according to an embodiment is applied is described in detail with reference to the drawings.

FIG. 1 is a schematic view illustrating a configuration of an engine system according to an embodiment.

As shown in FIG. 1, an engine system according to an embodiment may include an engine 120 including a plurality of cylinders 121 generating a driving torque required for driving the vehicle through fuel combustion, an intake line no through which fresh air (or ambient air) supplied to a cylinder 121 flows, an exhaust line 130 through which an exhaust gas exhausted from the cylinder 121 flows, a turbocharger 170 compressing the exhaust gas (hereinafter, also called a recirculation gas) recirculated to be mixed with the fresh air supplied to the cylinder 121, and an exhaust gas recirculation (EGR) apparatus 150 for recirculating the exhaust gas exhausted from the cylinder 121 to the cylinder.

A catalytic converter 160 for purifying various materials included in the exhaust gas exhausted from the cylinder 121 is provided on the exhaust line 130. The catalytic converter 160 may include an LNT (lean NOx trap) for purifying nitrogen oxide, a diesel oxidation catalyst, and a diesel particulate filter.

The turbocharger 170 may include a turbine 171 provided on the exhaust line 130 and configured to rotate by the exhaust gas exhausted from the cylinder 121 and a compressor 172 provided on the intake line 110 and configured to compress the fresh air and the recirculation gas by rotating with the turbine 171.

The exhaust gas recirculation apparatus 150 may include an EGR line 152 branching from the exhaust line 130 and joining the intake line 110, an EGR cooler 156 installed on the EGR line 152, and an EGR valve 154 installed on the EGR line 152. The EGR cooler 156 cools the exhaust gas of a high temperature recirculating through the EGR line 152. An amount of the recirculation gas recirculating the EGR line 152 is adjusted by an opening of the EGR valve 154.

An intercooler 116 is installed on the intake line no at a downstream side of the compressor 172, and an air-fuel mixture (the ambient air and the recirculation gas) of a high temperature and high pressure compressed by the compressor 172 of the turbocharger 170 is cooled by the intercooler 116.

A spark plug 1 for igniting the air-fuel mixture of the fuel and the air is mounted on the cylinder 121 of the engine.

Hereinafter, the spark plug 1 according to an embodiment of the present disclosure will be described in detail with reference to the accompanying drawings.

Figure 2:
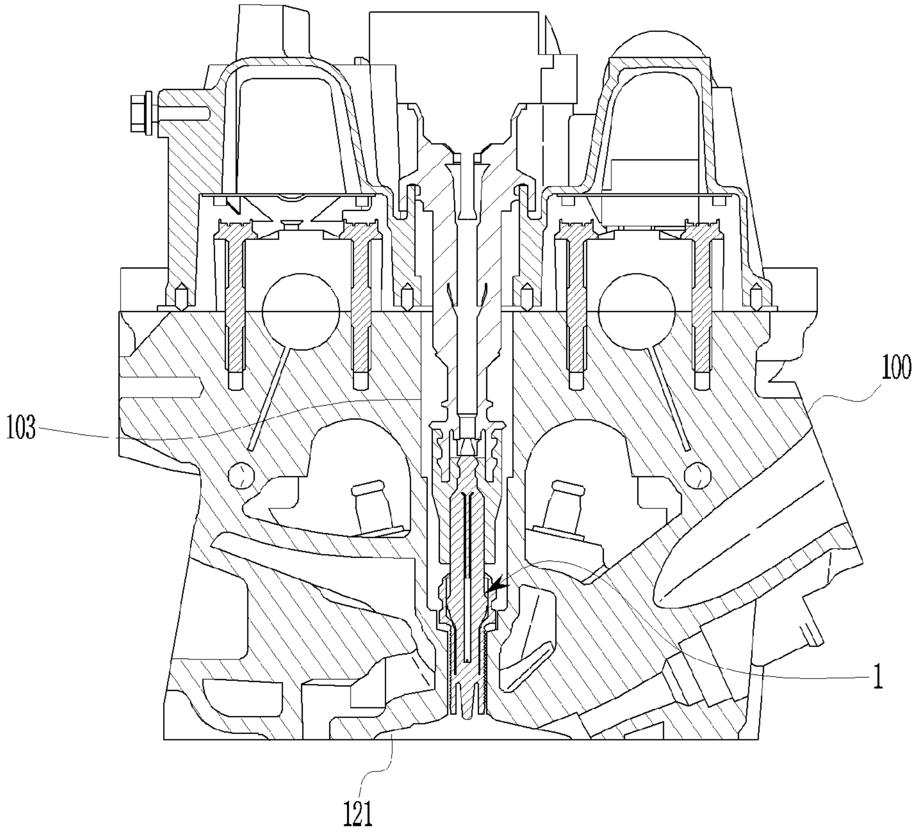
FIG. 2 illustrates a cross-sectional view of an engine in which a spark plug is mounted according to an embodiment of the present disclosure.

FIG. 2 illustrates a cross-sectional view of an engine in which a spark plug is mounted according to an embodiment of the present disclosure.

As shown in FIG. 2, the spark plug 1 according to an embodiment of the present disclosure is mounted on a cylinder of an engine and generates spark discharge.

The engine to which the spark plug 1 is applied includes a cylinder block and a cylinder head 100, and the cylinder block and the cylinder head wo are combined to form the cylinder 101 therein. An air-fuel mixture inflowing into the cylinder 101 is ignited by spark discharge generated by the spark plug 1.

In the cylinder head 100, a mount hole 103 in which the spark plug 1 is mounted is formed long in a vertical direction. A lower portion of the spark plug 1 that is mounted in the mount hole 103 protrudes into the cylinder 101. A center electrode 2 and a ground electrode 3 that are electrically connected to an ignition coil are formed at the lower portion of the spark plug 1, and the spark discharge is generated between the center electrode 2 and the ground electrode 3.

Figure 3:
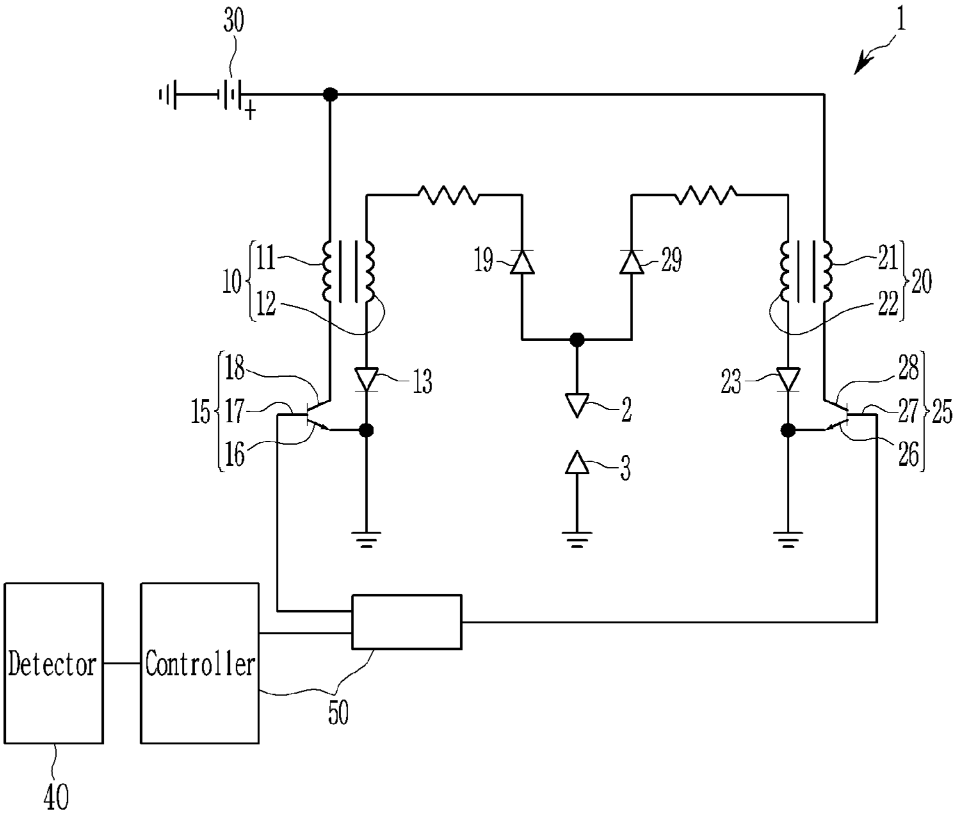
FIG. 3 illustrates a schematic view of an ignition coil control system according to an embodiment of the present disclosure.

FIG. 3 illustrates a schematic view of an ignition coil control system according to an embodiment of the present disclosure.

As shown in FIG. 3, a system for controlling an ignition coil according to an embodiment may include a detector 40 configured to detect whether the misfire of the engine occurs, the spark plug 1 including a pair of electrodes (e.g., a positive electrode and a negative electrode) that generate the spark discharge by a discharge current generated by a first ignition coil 10 and a second ignition coil 20, and a controller 50 configured to control an operation of the spark plug 1 and an operation of the engine.

The controller 50 may control the spark discharge generated between the pair of electrodes by adjusting the level and duration of the discharge current of two ignition coils (a first ignition coil and a second ignition coil) based on a first pulse signal having a preset voltage and a second pulse signal subsequent to the first pulse signal by a delay time.

In an embodiment, the controller 50 may be split into an engine controller controlling the engine and an ignition controller controlling the spark plug, but it may also be integrated as needed. That is, the engine controller and the ignition controller may be integrated into the controller 50.

The first ignition coil 10 includes a primary coil 11 and a secondary coil 12, a first end of the primary coil 11 is electrically connected to a battery 30 of a vehicle, and the other end of the primary coil 11 is grounded through a first switch 15. According to an on/off operation of the first switch 15, the primary coil 11 of the first ignition coil 10 may selectively receive electrical current.

The first switch 15 may be realized by an NPN-type transistor switch that includes an emitter terminal 16, a collector terminal 18, and a base terminal 17. That is, the other end of the primary coil 11 may be electrically connected to the collector terminal 18 of the first switch 15, the emitter terminal 16 thereof may be grounded, and the base terminal 17 thereof may be electrically connected to the controller 50.

A first end of the secondary coil 12 is electrically connected to the center electrode 2, and a second end is electrically connected to the emitter terminal 16 of the first switch 15. A diode 13 is installed between the secondary coil 12 and the emitter terminal 16, and thereby the current is blocked from flowing from the secondary coil 12 to the emitter terminal 16.

In addition, a diode 19 is installed between the secondary coil 12 and the center electrode 2, so that a current flows only from the secondary coil 12 to the center electrode 2.

When the controller 50 applies a control signal to the base terminal 17 of the first switch 15, the primary coil 11 of the first ignition coil 10 receives current, and electrical energy is charged to the primary coil 11. When the controller 50 does not apply the control signal to the base terminal 17 of the first switch 15, a high voltage current (or the discharge current) is generated in the secondary coil 12 due to electromagnetic induction of the primary coil 11 and the secondary coil 12. The discharge current generated in the secondary coil 12 flows to the center electrode 2, and while the spark discharge is being generated between the center electrode 2 and the ground electrode 3 by the discharge current generated in the secondary coil 12, an air-fuel mixture inside the cylinder 101 is ignited.

That is, the controller 50 turns on and off the first switch 15 to charge or discharge the first ignition coil 10. When the controller 50 applies the control signal to the base terminal 17 of the first switch 15 (or, when the switch is turned on), the primary coil 11 is charged (or, the first ignition coil 10 is charged).

In addition, when the controller 50 does not apply the control signal to the base terminal 17 of the first switch 15 (or, when the first switch is turned off), a high voltage current is generated in the secondary coil 12 due to electromagnetic induction with the primary coil 11, and due to the high voltage current generated by the secondary coil 12, the spark discharge is generated between the center electrode 2 and the ground electrode 3 (or, the first ignition coil 10 is discharged).

Like the first ignition coil 10, the second ignition coil 20 includes a primary coil 21 and a secondary coil 22, a first end of the primary coil 21 is electrically connected to the battery 30 of the vehicle, and the other end of the primary coil 21 is grounded through a second switch 25. According to an on/off operation of the second switch 25, the primary coil 21 of the second ignition coil 20 may selectively receive electrical current.

The second switch 25 may be realized by an NPN-type transistor switch that includes an emitter terminal 26, a collector terminal 28, and a base terminal 27. That is, the other end of the primary coil 21 may be electrically connected to the collector terminal 28 of the second switch 25, the emitter terminal 26 thereof may be grounded, and the base terminal 27 thereof may be electrically connected to the controller 50.

A first end of the secondary coil 22 is electrically connected to the center electrode 2, and a second end is electrically connected to the emitter terminal 26 of the second switch 25. A diode 23 is installed between the secondary coil 22 and the emitter terminal 26, and thereby the current is blocked from flowing from the secondary coil 22 to the emitter terminal 26.

In addition, a diode 29 is installed between the secondary coil 22 and the center electrode 2, so that a current flows only from the secondary coil 22 to the center electrode 2.

When the controller 50 applies the control signal to the base terminal 27 of the second switch 25, the primary coil 21 of the second ignition coil 20 receives current and electrical energy is charged to the primary coil 21. When the controller 50 does not apply the control signal to the base terminal 27 of the second switch 25, a high voltage current (or the discharge current) is generated in the secondary coil 22 due to electromagnetic induction of the primary coil 21 and the secondary coil 22. The discharge current generated in the secondary coil 22 flows to the center electrode 2, and while the spark discharge is being generated between the center electrode 2 and the ground electrode 3 by the discharge current generated in the secondary coil 22, an air-fuel mixture inside the cylinder 101 is ignited.

That is, the controller 50 turns on and off the second switch 25 to charge or discharge the second ignition coil 20. When the controller 50 applies the control signal to the base terminal 27 of the second switch 25 (or, when the switch is turned on), the primary coil 21 is charged (or, the second ignition coil 20 is charged).

In addition, when the controller 50 does not apply the control signal to the base terminal 27 of the second switch 25 (or, when the switch is turned off), a high voltage current is generated in the secondary coil 22 due to electromagnetic induction with the primary coil 21, and due to the high voltage current generated by the secondary coil 22, the spark discharge is generated between the center electrode 2 and the ground electrode 3 (or, the second ignition coil 20 is discharged).

In embodiments of this disclosure, charging the primary coil 11 of the first ignition coil 10 by turning on the first switch 15 is described in short as charging the first ignition coil 10, and generating the spark discharge between the center electrode 2 and the ground electrode 3 by turning off the first switch 15 to induce the high voltage current to the secondary coil 12 of the first ignition coil 10 is described in short as discharging the first ignition coil 10.

In the same way, charging the primary coil 21 of the second ignition coil 20 by turning on the second switch 25 is described in short as charging the second ignition coil 20, and generating the spark discharge between the center electrode 2 and the ground electrode 3 by turning off the second switch 25 to induce the high voltage current to the secondary coil 22 of the second ignition coil 20 is described in short as discharging the second ignition coil 20.

A system for controlling an ignition coil according to an embodiment may selectively perform a multi-stage ignition in which the spark discharge at the spark plug 1 is generated a plurality of times depending on an operation region of the engine, two ignition coils, or a single-stage ignition in which the spark discharge at the spark plug 1 is generated through one ignition coil of two ignition coils (first ignition coil and second ignition coil).

In addition, a system for controlling an ignition coil according to an embodiment may adjust the number of ignitions and a dwell time depending on whether the misfire of the engine occurs while performing the multi-stage ignition.

To this end, the controller 50 may be provided as at least one processor executed by a predetermined program, and the predetermined program is configured to perform respective steps of a control method of the ignition coil according to an embodiment of the present disclosure.

The detector 40 according to an embodiment is configured to detect whether the misfire of the engine occurs, and the detector 40 may include a speed sensor configured to detect the engine speed or a lambda sensor configured to detect oxygen concentration contained in the exhaust gas.

The controller 50 may determine whether the misfire of the engine occurs based on a change amount of the engine speed detected by the speed sensor or based on a change amount of oxygen concentration detected by the lambda sensor.

Hereinafter, the operation of the ignition coil control system according to an embodiment of the present disclosure as described above will be described in detail with reference to the accompanying drawings.

Figure 4:
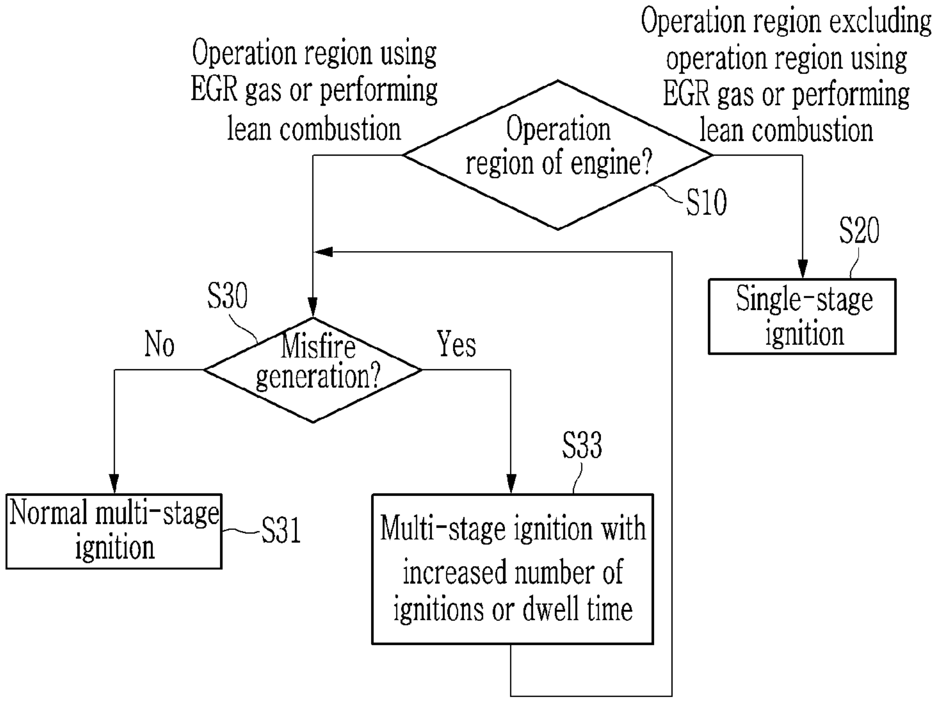
FIG. 4 is a flowchart showing a method for controlling an ignition coil according to an embodiment

FIG. 4 is a flowchart showing a method for controlling an ignition coil according to an embodiment.

As shown in FIG. 4, at step S10, the controller 50 determines the operation region of the engine, and depending on the operation region of the engine, selectively performs the multi-stage ignition or the single-stage ignition.

The multi-stage ignition means generating the spark discharge between the center electrode 2 and the ground electrode 3 of the spark plug 1 by using the two ignition coils (the first ignition coil and the second ignition coil), and the single-stage ignition means generating the spark discharge between the center electrode 2 and the ground electrode 3 of the spark plug 1 by using one ignition coil among the two ignition coils (first ignition coil and second ignition coil).

In an embodiment, the single-stage ignition or the multi-stage ignition may be selectively performed depending on the operation region of the engine.

For example, the multi-stage ignition is performed in an operation region of the engine in which the recirculation gas (EGR gas) is supplied to the cylinder of the engine through the exhaust gas recirculation apparatus, or the combustion that is leaner than the theoretical air/fuel ratio is performed. In other words, the operation region of the engine in which the multi-stage ignition is performed may be the operation region in which the EGR gas is used or the lean combustion is performed.

In the operation region in which the EGR gas is used or the lean combustion is performed, the EGR gas flows into the combustion chamber or the lean combustion is performed. Therefore, the multi-stage ignition is performed to supply a sufficient ignition energy to the air-fuel mixture (i.e., fuel plus air) within the cylinder, and thereby ignitability of the air-fuel mixture may be enhanced.

In other words, in the operation region in which the EGR gas is used or the lean combustion is performed, when the multi-stage ignition is performed, the discharge current at the spark plug 1 may be continuously generated through the two ignition coils 10 and 20, and therefore, ignitability of the air-fuel mixture introduced into the combustion chamber is enhanced.

In an operation region of the engine excluding the operation region in which the EGR gas is used or the lean combustion is performed, ignitability of the air-fuel mixture does not matter, and therefore, the single-stage ignition may be performed to prevent unnecessary power consumption.

Referring back to FIG. 4, at step S20, when the operation region of the engine is the operation region of the engine excluding the operation region in which the EGR gas is used or the lean combustion is performed, the controller 50 performs the single-stage ignition.

In addition, at step S30, when the operation region of the engine is the operation region of the engine including the operation region in which the EGR gas is used or the lean combustion is performed, the controller 50 determines whether the misfire of the engine occurs.

Figure 5:
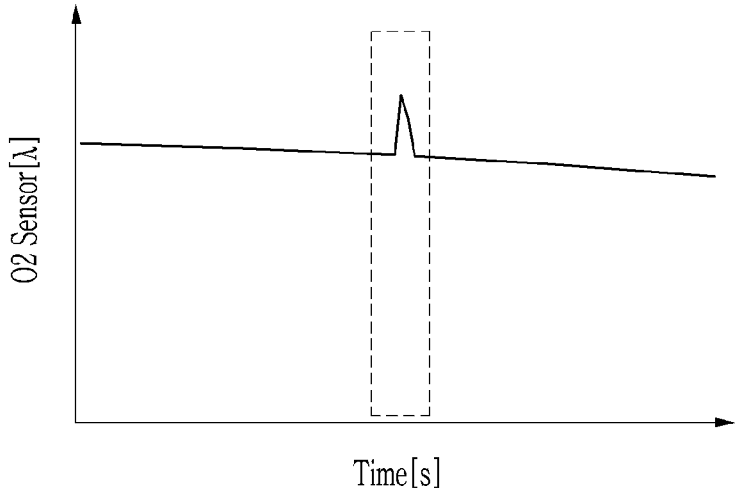
FIG. 5 and FIG. 6 are graphs illustrating occurrence of a misfire in an engine according to an embodiment.

The controller 50 may determine whether the misfire of the engine occurs based on a change amount of oxygen concentration (lambda) measured by the lambda sensor measuring the oxygen concentration included in the exhaust gas. Referring to FIG. 5, it may be seen that, when the misfire occurs in the engine, the lambda value abruptly changes because the combustion is not normal.

Figure 6:
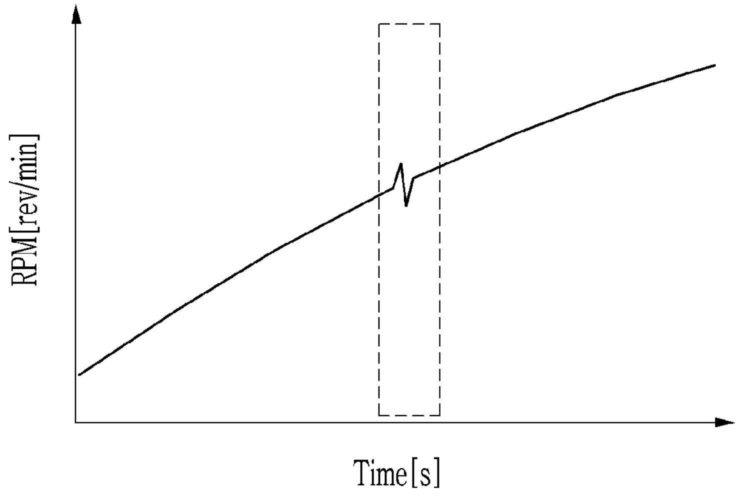

Alternatively, the controller 50 may determine whether the misfire of the engine occurs based on a change amount of the engine speed measured by the speed sensor measuring the engine speed. Referring to FIG. 6, it may be seen that, when the misfire occurs in the engine, a change amount of the engine speed is abruptly generated.

As such, the controller 50 may determine whether the misfire of the engine occurs through the change amount of the lambda value or the change amount of the engine speed.

When the misfire does not occur in the operation region in which the EGR gas is used or the lean combustion is performed, at step S31, the controller 50 performs the normal multi-stage ignition.

When the misfire is generated in the operation region in which the EGR gas is used or the lean combustion is performed, at step S33, the controller 50 temporarily increases the number of ignitions or the dwell time compared to the normal multi-stage ignition.

Figure 7:
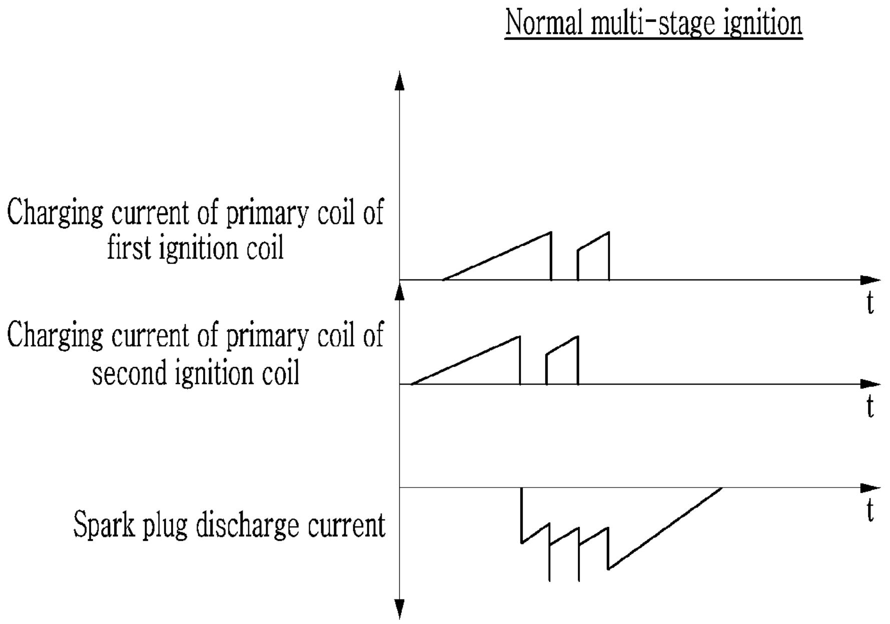
FIG. 7 to FIG. 10 illustrates an operation of an ignition coil according to an embodiment.
Figure 8:
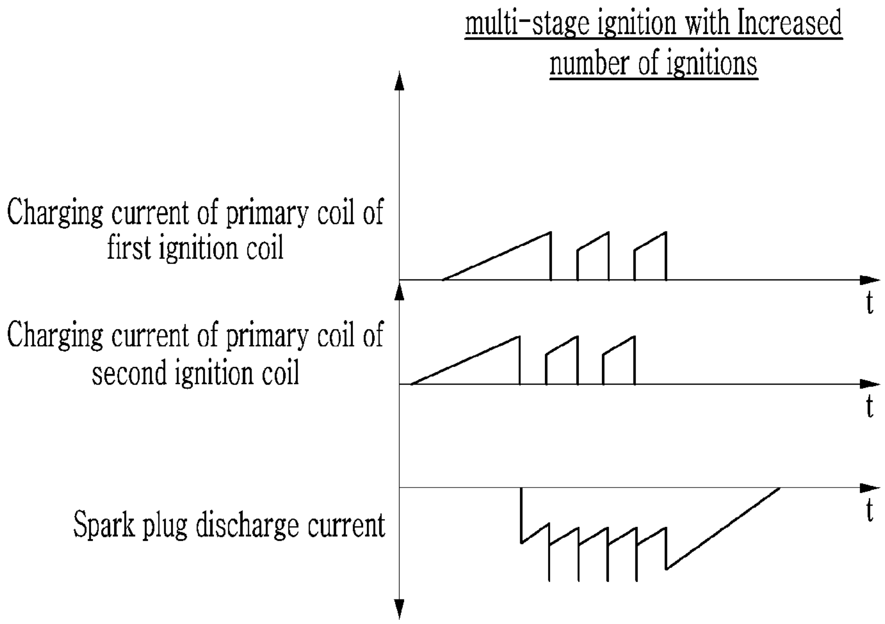

For example, in the normal multi-stage ignition, the number of ignitions (or, a number of discharges) by using the two ignition coils 10 and 20 may be 4 times (refer to FIG. 7). In this case, the number of charges and the number of discharges of the first ignition coil 10 and the second ignition coil 20 are 2 times, respectively. When the misfire is generated, the controller 50 increases the number of ignitions (or, the number of discharges) by using the two ignition coils 10 and 20 to 6 times (refer to FIG. 8) or 8 times. In this case, the number of charges and the number of discharges of the first ignition coil 10 and the second ignition coil 20 becomes 3 times or 4 times, respectively.

Figure 9:
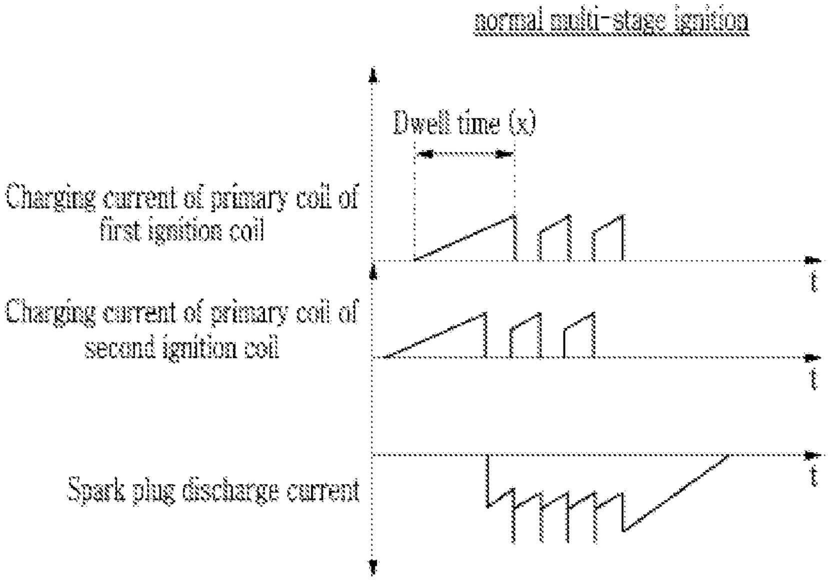
Figure 10:
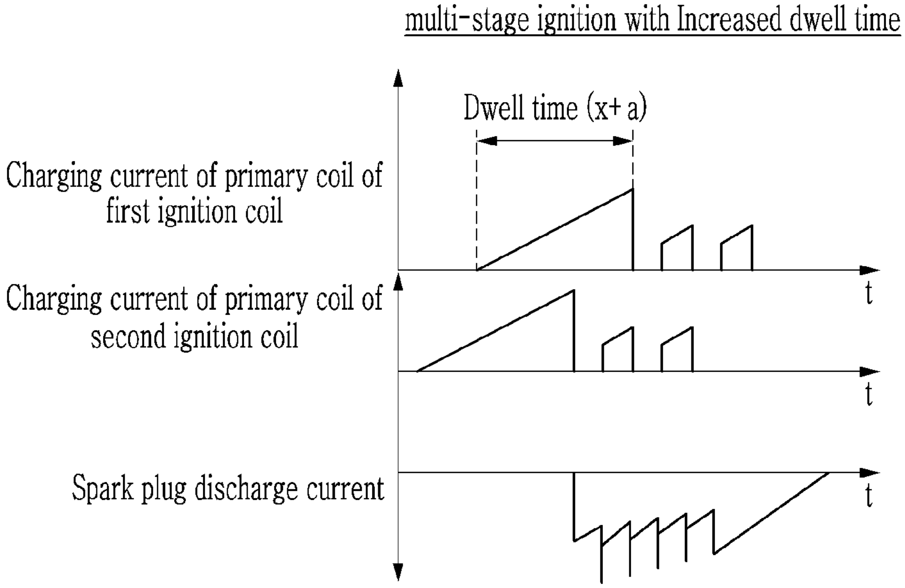

Alternatively, in the normal multi-stage ignition, the dwell time of the two ignition coils 10 and 20 may be "x" seconds (refer to FIG. 9). However, when the misfire is generated, the controller 50 temporarily increases the dwell time of the two ignition coils 10 and 20 to "x+a" seconds (refer to FIG. 10). Here, the dwell time means the time for which the primary coil of the ignition coil is fully charged.

As such, when the number of ignitions or the dwell time of the multi-stage ignition is increased in the case that the misfire occurs, the discharge energy is increased, thereby increasing ignitability, and accordingly, rapidly suppressing the misfire.

When the misfire continues to occur, a catalytic converter for purifying the exhaust gas is degraded, and accordingly, a large amount of hydrocarbon (HC) is exhausted. On the other hand, when the number of charges (or, the number of discharges) and/or the dwell time is continuously increased during the multi-stage ignition in order to suppress the misfire, excessive heat may be generated by the ignition coil and the switching elements, and accordingly, the ignition coil may be damaged. Therefore, in an embodiment, when the misfire occurs in the operation region performing the lean combustion of the engine, the number of ignitions (or, the number of discharges) and/or the dwell time is temporarily increased, and therefore, the misfire may be rapidly suppressed while preventing degradation of the ignition coil at the same time.

While embodiments of this disclosure have been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A system for controlling an ignition coil, the system comprising:
- a first ignition coil comprising a first primary coil and a first secondary coil;
- a second ignition coil comprising a second primary coil and a second secondary coil;
- a spark plug comprising a pair of electrodes configured to generate a spark discharge by a discharge current generated by the first ignition coil and the second ignition coil; and
- a controller configured to:
  - selectively perform a multi-stage ignition through the first ignition coil and the second ignition coil or a single-stage ignition through the first ignition coil or the second ignition coil depending on an operation region of an engine; and
  - in response to a misfire occurring in the engine while performing the multi-stage ignition, adjust a number of ignitions or a dwell time.

2. The system of claim 1, wherein:
- in a case in which the operation region of the engine is an operation region in which an EGR gas is used or a lean combustion is performed, the controller is configured to perform the multi-stage ignition; and
- in a case in which the operation region of the engine is not the operation region in which the EGR gas is used or the lean combustion is performed, the controller is configured to perform the single-stage ignition.

3. The system of claim 2, wherein, in response to the misfire occurring in the engine, the controller is configured to:
- increase a number of discharges of the first ignition coil and the second ignition coil; or
- increase the dwell time of the first ignition coil and the second ignition coil.

4. The system of claim 1, wherein the controller is configured to determine whether the misfire of the engine occurs based on a change amount of an engine speed measured by a speed sensor.

5. The system of claim 1, wherein the controller is configured to determine whether the misfire of the engine occurs based on a change amount of an oxygen concentration measured by a lambda sensor.

6. A method for controlling an ignition coil, the method comprising:
- determining an operation region of an engine;
- performing a multi-stage ignition or a single-stage ignition based on the determined operation region;
- while performing the multi-stage ignition, determining whether a misfire occurs in the engine; and
- in response to a determination that the misfire occurs in the engine while performing the multi-stage ignition, temporarily increasing a number of ignitions or a dwell time.

7. The method of claim 6, wherein:
- in response to the determined operation region being an operation region in which an EGR gas is used or a lean combustion is performed, the multi-stage ignition is performed; and
- in response to the determined operation region not being the operation region in which the EGR gas is used or the lean combustion is performed, the single-stage ignition is performed.

8. The method of claim 7, wherein, in response to the determination that the misfire occurs in the engine, the method further comprises:
- increasing a number of discharges of a first ignition coil and a second ignition coil; or
- increasing the dwell time of the first ignition coil and the second ignition coil.

9. The method of claim 6, wherein determining whether the misfire of the engine occurs comprises determining a change amount of an engine speed measured by a speed sensor.

10. The method of claim 6, wherein determining whether the misfire of the engine occurs comprises determining a change amount of an oxygen concentration measured by a lambda sensor.

11. A vehicle comprising;
- a vehicle body;
- a battery mounted in the vehicle body;
- an engine mounted in the vehicle body, the engine comprising a plurality of cylinders;
- an ignition coil comprising a first ignition coil comprising a first primary coil and a first secondary coil and a second ignition coil comprising a second primary coil and a second secondary coil, wherein a first end of the first primary coil and a first end of the second primary coil are electrically connected to the battery;
- a spark plug mounted in a cylinder of the plurality of cylinders, the spark plug comprising a pair of electrodes configured to generate a spark discharge by a discharge current generated by the first ignition coil and the second ignition coil;
- a detector configured to detect whether a misfire of the engine occurs; and
- a controller configured to:
  - determine an operation region of the engine;
  - selectively perform a multi-stage ignition through the first ignition coil and the second ignition coil or a single-stage ignition through the first ignition coil or the second ignition coil based on the determined operation region of the engine; and
  - while performing the multi-stage ignition, and in response to a determination that the misfire of the engine occurs, adjust a number of ignitions or a dwell time.

12. The vehicle of claim 11, wherein:

in a case in which the determined operation region of the engine is an operation region in which an EGR gas is used or a lean combustion is performed, the controller is configured to perform the multi-stage ignition; and in a case in which the determined operation region of the engine is not the operation region in which the EGR gas is used or the lean combustion is performed, the controller is configured to perform the single-stage ignition.

13. The vehicle of claim 12, wherein, in response to the determination that the misfire of the engine occurs, the controller is configured to:

increase a number of discharges of the first ignition coil and the second ignition coil; or increase the dwell time of the first ignition coil and the second ignition coil.

14. The vehicle of claim 11, wherein the detector comprises a speed sensor, and wherein the controller is configured to determine whether the misfire of the engine occurs based on a change amount of an engine speed measured by the speed sensor.

15. The vehicle of claim 11, wherein the detector comprises a lambda sensor, and wherein the controller is configured to determine whether the misfire of the engine occurs based on a change amount of an oxygen concentration measured by the lambda sensor.

16. The vehicle of claim 11, wherein the controller comprises an engine controller configured to control the engine and an ignition controller configured to control the spark plug.

* * * * *